US007778940B2

(12) United States Patent
Mazzarella (10) Patent No.: US 7,778,940 B2
(45) Date of Patent: Aug. 17, 2010

(54) SYSTEM AND METHOD FOR CREATING AND OPERATING AN ENHANCED DISTRIBUTED ENERGY NETWORK OR VIRTUAL POWER PLANT

(76) Inventor: Joseph R. Mazzarella, 110 Doyle Rd., Tolland, CT (US) 06084

(*) Notice: Subject to any disclaimer, the term of this patent is extended or adjusted under 35 U.S.C. 154(b) by 1517 days.

(21) Appl. No.: 10/194,483

(22) Filed: Jul. 11, 2002

(65) Prior Publication Data
US 2003/0144864 A1 Jul. 31, 2003

Related U.S. Application Data (60) Provisional application No. 60/304,676, filed on Jul. 11, 2001, provisional application No. 60/351,994, filed on Jan. 25, 2002.

(51) Int. Cl.
*G01R 11/56* (2006.01)
(52) U.S. Cl. ...................................... 705/412
(58) Field of Classification Search .................. None
See application file for complete search history.

(56) References Cited

U.S. PATENT DOCUMENTS

| | | | | |
|---|---|---|---|---|
| 4,675,828 A | * | 6/1987 | Winston | 700/286 |
| 4,731,547 A | | 3/1988 | Alenduff et al. | 307/85 |
| 5,274,571 A | * | 12/1993 | Hesse et al. | 700/291 |
| 5,432,710 A | * | 7/1995 | Ishimaru et al. | 705/412 |
| 5,517,423 A | | 5/1996 | Pomatto | 364/492 |
| 5,694,329 A | | 12/1997 | Pomatto | 364/492 |
| 5,818,725 A | | 10/1998 | McNamara et al. | 364/483 |
| 5,835,383 A | | 11/1998 | Onizuka et al. | 364/528.32 |
| 5,873,251 A | * | 2/1999 | Iino | 60/660 |
| 5,880,677 A | | 3/1999 | Lestician | 340/825.06 |
| 5,963,457 A | | 10/1999 | Kanoi et al. | 364/528.26 |
| 6,061,609 A | | 5/2000 | Kanoi et al. | 700/291 |
| 6,115,698 A | * | 9/2000 | Tuck et al. | 705/37 |
| 6,219,623 B1 | | 4/2001 | Wills | 702/60 |
| 6,243,244 B1 | | 6/2001 | Nelson et al. | 361/64 |
| 6,255,805 B1 | | 7/2001 | Papalia et al. | 323/207 |

(Continued)

OTHER PUBLICATIONS

"Distributed Generation Poised to Win Over End Users.", Betz, Kenneth W., Energy User News, Apr. 2000.*

(Continued)

*Primary Examiner*—John W Hayes
*Assistant Examiner*—Rob Wu
(74) *Attorney, Agent, or Firm*—Sterne Kessler Goldstein & Fox, P.L.L.C.

(57) ABSTRACT

A system and method for operating a distributed power generation system comprising one or more Local Production Units (LPPUs) is provided. The method includes the steps of receiving and storing data relating to the operating performance of a plurality of LPPUs, receiving and storing data relating to the local power consumption for the plurality of LPPUs, determining the available aggregate quantity of excess power generation capacity for the plurality of LPPUs based upon the operating performance data and the power consumption data, communicating to at least one power purchasing entity an offer to sell at least part of the available aggregate quantity of excess power generation capacity, receiving from at least one power purchasing entity an order to purchase, and communicating with the plurality of LPPUs to provide each LPPU with instructions regarding the quantity of power to be produced. The system includes means for performing each of these steps.

11 Claims, 5 Drawing Sheets

U.S. PATENT DOCUMENTS

| | | | |
|---|---|---|---|
| 6,346,875 B1 | 2/2002 | Puckette et al. | 340/310.01 |
| 6,473,744 B1* | 10/2002 | Tuck et al. | 705/412 |
| 6,512,966 B2* | 1/2003 | Lof et al. | 700/291 |
| 6,925,361 B1* | 8/2005 | Sinnock | 700/286 |
| 6,983,640 B1* | 1/2006 | Staphanos et al. | 73/23.31 |
| 2001/0007086 A1 | 7/2001 | Rogers et al. | |
| 2002/0143438 A1* | 10/2002 | Akiyama et al. | 700/286 |
| 2003/0041002 A1* | 2/2003 | Hao et al. | 705/37 |

OTHER PUBLICATIONS

Fairley, Peter, "Power to the People", Technology Review, May 2001, 70-77.

Enermetrix web pages from www.enermetrix.com (5 pages).

Fisher, Susan, "Retail Energy Exchanges Light Up the Web", Feb. 19, 2001.

"Information Management Bandwagon", Energy Decisions, 1999.

"Silicon Energy and Sixth Dimension Partner to Provide Total Distributed Energy Management Solution", Oct. 2001.

Abstract, "Virtual Utilities Peddle Power Over the Web," Wall Street Journal, Jan. 6, 2000.

Abstract, "Making unit commitment decisions when electricity is traded at spot market prices," 2001 IEEE Power Engineering Society Winter Meeting Conference Proceedings.

* cited by examiner

SYSTEM AND METHOD FOR CREATING AND OPERATING AN ENHANCED DISTRIBUTED ENERGY NETWORK OR VIRTUAL POWER PLANT

RELATED APPLICATIONS

This application claims the benefit of provisional application Serial No. 60/304,676 filed on Jul. 11, 2001, and provisional application Serial No. 60/351,994 filed on Jan. 25, 2002, both of which are incorporated herein in their entirety by reference.

A portion of the disclosure of this patent document, submitted on compact disc in accordance with 37 CFR §1.96, contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a system and method for operating enhanced distributed power systems, and more particularly to a distributed power system which is comprised of at least two separate power generating nodes. System data is collected and the system is managed, monitored, and operated through a communications (wireless and/or wireline) network, thereby forming a "virtual power plant".

COMPUTER PROGRAM SUBMITTAL

Pursuant to 37 C.F.R. §1.52(e), Applicant has submitted a computer program listing appendix on a compact disc comprising the following files:

| File Name | Date of Creation of Disc | Size in Bytes |
|---|---|---|
| fuelcellcode | Jul. 1, 2002 | 53 KB |
| NOCdahboardcode | Jul. 1, 2002 | 66 KB |
| NOCserverappcode | Jul. 1, 2002 | 50 KB |

Applicant incorporates herein by reference the material on the compact disc as identified above in its entirety.

BACKGROUND OF THE INVENTION

The demand for electrical power is increasing dramatically. The recent energy crisis in California is an indication of similar power shortages that will likely arise in the future across the United States. One way to mitigate this energy shortage is to make use of energy resources that already exist or will exist in the future in the form of small power generating systems, whether they be fuel cells, micro-turbines, solar and wind based electrical generating devices or other types of power generating systems designed to provide local power. Installation of alternative energy and clean energy power generation systems that are intended to be deployed on, in or near a user's premises or load requirements is increasing. The desire for clean energy and mitigating environmental impacts of conventional power generation facilities seem at odds with the needs of increased power production, and the associated adverse environmental impacts with conventional power plant siting, construction and operation. By constructing virtual power plants with many distributed nodes that generate clean energy and reduce or eliminate any adverse impact to the physical environment, the two seemingly incompatible public policy goals can be satisfied. Moreover, by harnessing numerous small units for collective operation and production, specific and coordinated energy inputs can be made into the electric power markets.

Local power production units, such as for example fuel cells, typically provide all or part of the electrical power needed for one or more users in a local area, either for primary or back-up purposes. The users can be a single residence or business, or there may be a localized group of residences or businesses using the power produced by one or more local power production units ("LPPUs"). In some cases, the LPPUs may also provide heat energy to local users and thereby increase the overall efficiency of energy use.

The LPPUs often are capable of producing more electrical power than is being used locally. For example, when an LPPU such as a fuel cell is installed at a residence, the fuel cell is typically sized to meet most or all of the residence's peak power requirement. During most of the day, the residence's power requirements are significantly less than the peak demand. Accordingly, there may be an excess of generating capacity during portions of the day, and this excess generating capacity can be used to produce power to be sold to utilities or other users.

One problem associated with net metering or private power producer arrangements is that the user generally does not have the resources to monitor its LPPUs and sell excess generating capacity to others. In many cases, the LPPU operation is controlled by local programmable site controller systems which require command execution at the local site level and house static program executable functions within the local environment. Moreover, the amount of excess generating capacity available from any one LPPU may not be sufficient to be used economically by a potential purchaser.

There is a need for an improved system and method for creating and operating an enhanced distributed energy network. This would allow owners or users of LPPUs, or others on behalf of or through users or owners, to aggregate the excess generating capacity available from a plurality of LPPUs and sell the excess capacity to the energy marketplace, energy buyers or other energy users. Aggregation of LPPUs into power generating nodes can offer other advantages, such as aggregation of fuel purchases to obtain better pricing and scheduling of routine and emergency maintenance. Other objects and advantages of the methods and systems described herein will be readily apparent to those skilled in the art based upon the description of the invention provided below.

SUMMARY OF THE INVENTION

The present invention is directed to a system and method for creating and operating an enhanced distributed energy network. A plurality of local power producing units ("LPPUs") are interconnected using wide-area networking and distributed control technologies. By networking and interconnecting the LPPUs with a centralized computing platform, the LPPUs can be collectively monitored, managed and controlled to optimize their performance, maintenance and economic value. The method of the present invention includes the steps of receiving and storing real time (or stored and forwarded) data relating to the operating characteristics of one or more local power production units (LPPUs). The real time operating data is used to determine the excess generating capacity of each LPPU based upon several factors, which may include, for example, the time of day, the season, and temperature. A microprocessor unit, employing executable programs and functions, processes the operating data to determine a statistically reliable projection of the aggregate excess generation capacity of the LPPUs.

In addition, the method further includes the step of communicating with entities that purchase power to sell the excess generating capacity of the LPPUs. Preferably, the step of communicating with purchasing entities takes place by communicating with the purchasing entities via a data communications pathway, such as the Internet, or other dynamically routed or dedicated communications path to make offers and accept bids for the purchase and sale of power. The price obtained for the available excess capacity must typically be greater than the marginal cost of producing the power.

After a contract or commitment for sale of excess generating capacity is entered, the method further includes the step of communicating with each of the LPPUs to direct the LPPUs to generate excess power for transmission and sale at either or both a specified time and quantity. The quantity of power transmitted to the purchasing entities is measured using an electronic meter, and the data is received and stored.

The system for creating and operating the enhanced distributed energy network includes means for receiving and storing data relating to the operating characteristics of one or more LPPUs, means for determining a statistically reliable projection of the amount of excess generating capacity for each LPPU, means for communicating the amount of available excess capacity to purchasers, means for communicating with the LPPUs to direct the LPPUs to generate power for transmission and sale, and means to receive and store data regarding the quantity of power sold by the LPPUs.

A preferred embodiment provides means and methods to (1) create a distinct entity that is a virtual electrical power generator utilizing fuels cells, micro-turbines, cogeneration plants and other power plants located at end-user premises that are interconnected with the power grid through a distributed data and application network topology; (2) allow aggregators the ability to pool excess or surplus power from two or more distributed power systems that are each separately interconnected with the grid in an orderly, knowledgeable, and controlled and controllable manner, and to sell or make the power available to various power market constituents and consumers; (3) operate with a private grid, and private power generation and transmission and delivery infrastructure that allows end-users with a community of interests to interconnect with one another for primary or supplementary power purposes; (4) create an interconnected private grid that permits both power allocation and delivery within a community of users, and permits surplus power to be sold or delivered back to the public grid on their behalf; and/or (5) provide a method to alleviate or reduce the need for new or additional high capacity power transmission infrastructure.

These and other unique features of the system and method disclosed herein will become more readily apparent from the following detailed description and the accompanying drawings.

BRIEF DESCRIPTION OF THE DRAWINGS

So that those having ordinary skill in the art to which the disclosed system and method appertains will more readily understand how to make and use the same, reference may be had to the drawings wherein.

DETAILED DESCRIPTION OF THE PREFERRED EMBODIMENT

The present invention provides a novel system and method for creating and operating a virtual distributed energy plant that is comprised of two or more fuels cells, micro-turbines, solar or wind based electrical generating devices, water turbines, bio-mass generators, photovoltaic collectors, co-generation plants, and/or other electrical energy generating sources that are located at or close to end-user premises (such as a home, business, commercial enterprise, government building, or complex, multi-tenant complex or similar environment). These local electrical generating sources are referred to herein and in the claims as "local power production units" ("LPPU"). LPPUs include fuel cells, micro-turbines, wind turbines, water turbines, bio-mass generators, photovoltaic and solar collectors, co-generation plants or any other electrical energy producing devices. The LPPUs may be located on, in close proximity to, or may be dedicated to serving, on a cooperative or similar joint ownership or use basis, the premises of end-users of the electrical output from the LPPU. The LPPUs typically are intended to generate and provide electrical energy directly to the end-user premises.

To form a distributed energy plant of the present invention, two or more LPPUs are interconnected with one another through a data communications network with a centralized computing site. Each LPPU, or a plurality of LPPUs that are grouped together based upon defined parameters, can be considered a node of the energy distribution network. Each such node consists of one or more LPPU and the associated transceiver network interface devices, one or more micro-processing units and any other equipment, apparatus or devices that are useful or related to the operation, control, data generation and monitoring of the localized system, including the LPPU, and its subparts. The terms "LPPU" and "node" are used interchangeably herein, and where the following description refers to "LPPU" the term "node" may be substituted, except that a "node" may have one or more LPPUs.

Each of the nodes is remotely monitored, managed and operated through centralized application server(s), which enables the creation of a distinct, fully integrated, intelligent network based power producing entity or device which is capable of managing two or more LPPUs for the collective optimization of the constituent LPPUs, and the collective negotiation, arrangement of the supply of, sale of and/or delivery of power from any such LPPUs to any and all such other persons or entities who are engaged in the activity of buying, selling or exchanging power for the purposes of directly or indirectly supplying, distributing, selling, or reselling electrical energy to users and/or consumers of electrical energy (such as, but not limited to, suppliers, distributors, wholesalers, aggregators, resellers, market makers, securities and/or derivative securities issuers, any and all of the foregoing entities being referred to herein as "Market Entities"). Heretofore, devices for LPPUs have typically been limited to apparatus that provide a means for electrical source sharing wherein one or more local power generators are placed in source sharing configuration states that are intended to optimize the local economic impact of certain load configurations based upon either a non-interconnected power grid state (independent state) or an interconnected state wherein the configuration state of each such unit is further determined by the plurality of outcomes and factors dictated by "net metering" or similar laws governing local unit interconnection rights. In contrast, the embodiments disclosed herein are substantially different systems in that the embodiments are designed, through a combination of networking, remote data and application processing and together with the application of certain possible legal business modalities, to create a distinct power generating system that is comprised of fully integrated power producing nodes. It is within this unique state that aggregated and unified business processes are permitted to occur which are then capable of permitting the sale of generated power on a market-wide basis without restriction or regard to individual localized units.

The virtual distributed energy network of the present invention may include any number of network and communication mechanisms and methods well known to those skilled in the art of networking and data communications. For example, the virtual distributed energy network may be a combination of local area networks (LAN), wide area networks (WAN), intranets or the Internet, as is well known. In a preferred embodiment, the network employs an internet protocol (IP) communications pathway, such as the Internet, private IP network or virtual private network system.

Figure 1:
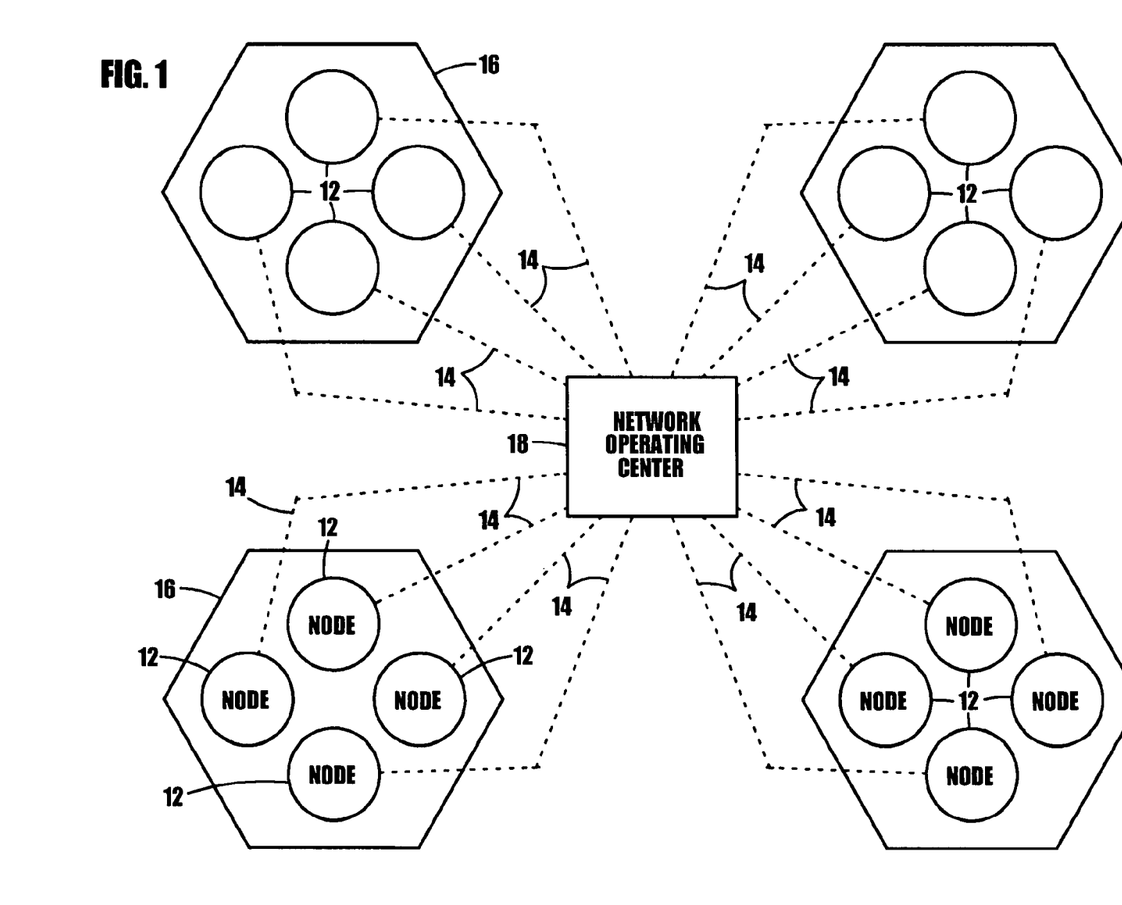
FIG. 1 is a schematic representation of part of an enhanced distributed energy network.

Referring now to FIG. 1, there is illustrated a schematic representation of part of the enhanced distributed energy network. The network 10 includes a plurality of distributed nodes 12 which are each comprised of one or more LPPUs (not shown). For operational purposes, LPPUs may be grouped together in nodes 12, and nodes 12 may be in turn statically or dynamically grouped together based upon one or more parameters satisfied by each node in a group 16. For example, nodes may be grouped together based upon parameters such as geography, mutual proximity, combined generation outputs, peaking/non-peaking environments and market load requirements, and incumbent transmission and delivery system architectures, or any other appropriate parameter. A node 12 may satisfy and be a member of more than one group 16 based upon a plurality of set definitions and established parameters. The nodes 12 may be interconnected with the incumbent power transmission grid as a group through one or more interconnection configurations. Alternatively, each LPPU in a node may be individually interconnected with the incumbent power transmission grid. It is also possible for the nodes 12, or each LPPU in a node 12, to be interconnected with a private electrical transmission system that serves one or more local load points, such as, but not limited to, one or more residences or businesses located within a condominium or planned unit development, land subdivision, reciprocal or joint easement or easement in gross arrangement, or any other arrangement wherein power is generated, transmitted or shared by and between two or more residences or businesses. Each of the nodes is interconnected by a data communications pathway 14 to a network operating center 18.

Figure 2:
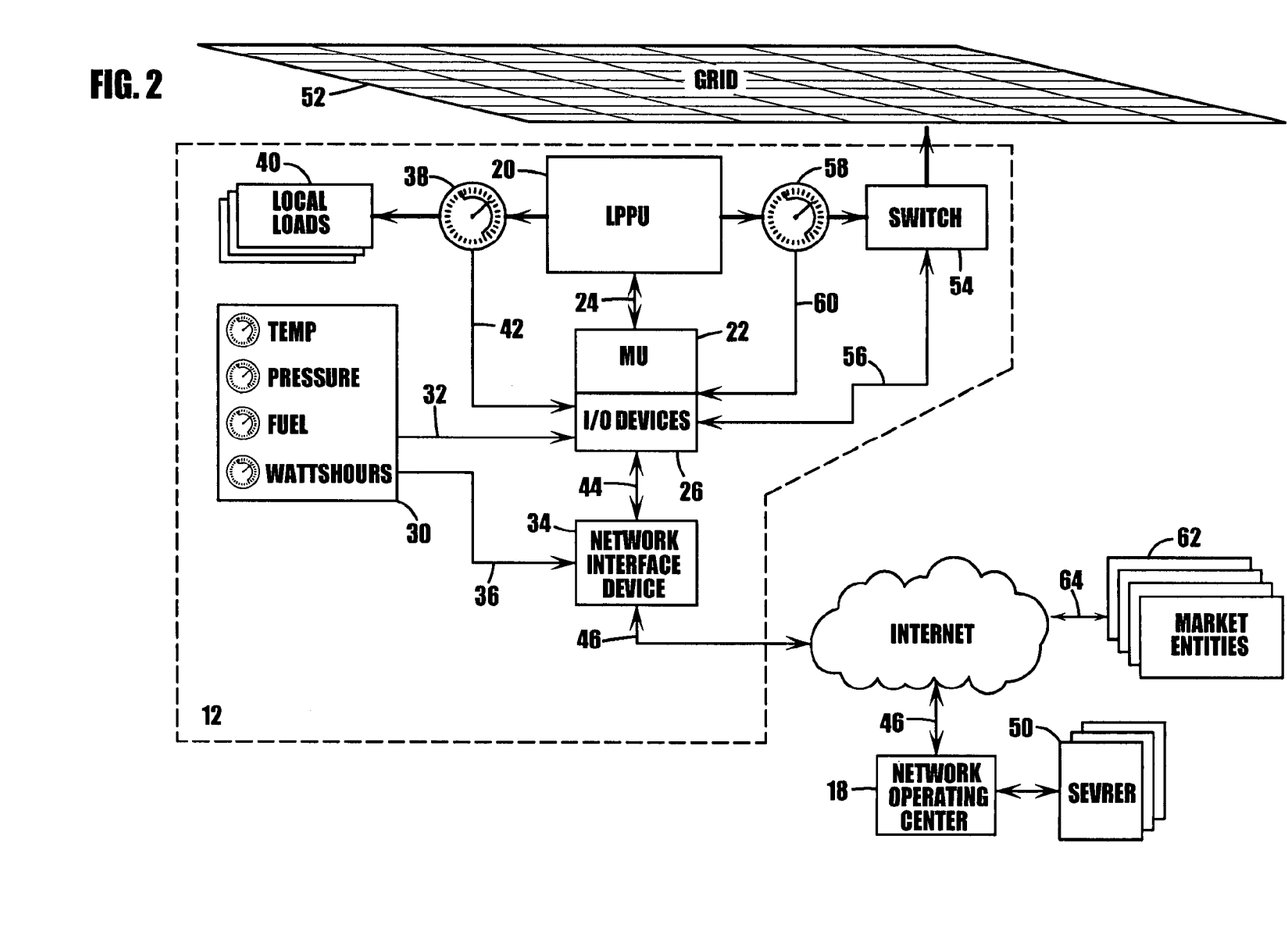
FIG. 2 is a schematic illustration of the components of one embodiment of the distributed energy network.

Referring now to FIG. 2, which shows a schematic representation of the components of a preferred embodiment of the present invention wherein the node 12 has a single LPPU 20 for simplicity. The LPPU 20 interfaces with a micro-processing unit (MU) 22 via data path 24. The MU 22 is interconnected with data input/output devices 26 by means of one or more data backplanes or communications paths, such as a RS 232 bus, USB, token ring, ethernet, or any other topology or other bus configuration using any data transmission specification or data transmission protocol or medium such as a physical wire or circuit or wireless circuit.

The preferred embodiment of an MU 22 is a dynamically programmable microprocessor with capabilities to receive, store, process and send data, and perform executable instruction sets that are either native to (i.e., residing within) the MU 22 or sent from an external source. Appropriate equipment known to one skilled in the art, such as for example a keyboard and monitor, may be provided to allow local communication with the MU. An example of an MU that may be used is an aJile Systems aJ-100 real-time low power Java™ Processor.

The MU 22 may be located within, or otherwise affixed to or interconnected (either directly or indirectly) with, the LPPU 20. The MU 22 may also be interconnected with data devices 30 such as electrical meters, thermometers, gas and fuel pressure meters, fuel consumption meters or any other meter or device that may provide information regarding operating parameters to the MU 22 via data path 32 to the input/output devices 26. The data devices 30 may interconnect and communicate data and information directly to the MU 22 via data path 32 or the network interface device 34 via data path 36. Each MU 22 serves as a Java Virtual Machine (or other dynamic code machine) or programmable microprocessor that is capable of reading, transmitting and processing either applets or structured data to a microprocessor server that is remotely located at a network operating center 18. The MU 22 provides means for receiving and storing data related to the operating performance of one LPPU 20, or of a plurality of LPPUs, as would be appreciated by one of ordinary skill in the art. The MU 22 may also provide means for receiving and storing data measured by a local meter 38 relating to the local power consumption of power generated by the LPPU 20 by local loads 40.

The data generated by local meter 38 is provided to the MU 22 via data path 42. Other means for receiving and storing operational and power consumption information may also be used. For example, means may be provided to transmit the data using the data transmission devices described herein or other transmission devices known to those skilled in the art to a common server or other appropriate device for receipt and storage of data.

The MU 22 is connected to a network interface device 34 via data path 44, and where applicable, fixed wireless transceiver devices, which provide means for data transmissions across a defined communications pathway to and from the data input/output devices to be interfaced with the MU 22 and to and from the network operating center 18 via data path 46. The network interface device 34 may also perform, independently or in concert with one or more MUs, data storage, data store and forward, data processing and application execution functions that are complimentary, in substitution of, or as a back-up for repetitive purpose, to the MUs or the applications and functions residing at the network operating center 18. The MU 22, associated data input/output devices, and the network interface device 34 may be separate independent devices, or devices housed in separate physical device enclosures, or may be comprised of or reside on a single or multiple microprocessing devices or systems, and integrated at an operating system, routine, subroutine level and/or at an internal or external data bus or communications path, application level or network level.

Communications means and communications pathways are provided for transmitting data to and from one or more LPPUs to one or more other LPPUs, links, or points within the network, including one or more central data processing units that are not located on the LPPU premises or that may be located anywhere within the network, such as the network operating center, or anywhere external to the system. The communications pathway may consist of any dedicated or shared communications medium, of either an actual or virtual circuit nature, and includes wireless transmission paths, such as, but not limited to, radio frequency transmission paths utilizing commercial mobile and fixed radio and private mobile and fixed radio transmission media, microwave and satellite media, spread spectrum frequencies, and wireline transmission media, including plain old telephone (POTs) (both in-band and out of band), digital subscriber line (DSL), optical and coaxial media, and electrical power lines and transmission system means that send, receive or transport data or information over such mediums, or any other transmission means known to those skilled in the art.

Still referring to FIG. 2, the network includes one or more centralized data and application processing network operating centers 18 that are interconnected, directly or indirectly, with their respective LPPU 20 through one or more of the communications pathways 46. In a preferred embodiment, the network operating center 18 is connected to the LPPU 20, via the network interface device 34, through an internet protocol (IP) communications pathway, such as the Internet, private IP network or virtual private network system. Located at each network operating center 18 is one or more database and application servers 50, comprised of micro-processors, computers or data storage devices which enable the storage, retrieval and processing of data from the LPPU 20 (via the network interface device 34) and related local data input/output devices and the running of applications which are designed to remotely monitor, control and operate the LPPU 20 and other related data devices 30.

The LPPU 20 is interconnected with an electrical power distribution grid 52 to permit the transmission of electrical power thereto. The power distribution grid may be the incumbent utility transmission grid, or it may be a localized, private transmission grid. An interconnection device, such as an interconnection switch 54, and one or more meter(s) 58 are provided in the interconnection between the LPPU 20 and the electromechanical or mechanical interconnection devices that interface the LPPU with the grid 52. The switch 54 is controlled by signals received from the network operating center 18, via the data path 56 pathway to the network interface device 34, and thence to the data input/output devices 26 and MU 22 via data path 44. From the MU 22, or from locally derived instructions from either a mechanical switching device and/or microprocessing device based switch residing natively or the MU 22, controlling signals are passed via data path 56 to the switch 54. The network operating center 18 determines when the LPPU 20 should transmit power to the grid 52 and orders the interconnection switch 54 to close. The interconnection switch 54 and the LPPU 20 include appropriate devices known to those skilled in the art to allow proper and safe interconnection between an LPPU 20 and the distribution grid 52.

Preferably, a meter 58 is provided to measure the amount and quality of power delivered to the grid 52 from the LPPU 20. The meter 58 communicates data to the MU 22 via data path 60, or it may provide data directly to the network operating center 18, which is stored and used, among other purposes, to effectuate power bidding, sale, delivery and payment functions with market entities 62 via data path 64. Meters 58 for measuring power and communicating data are well known to those skilled in the art.

Figure 3:
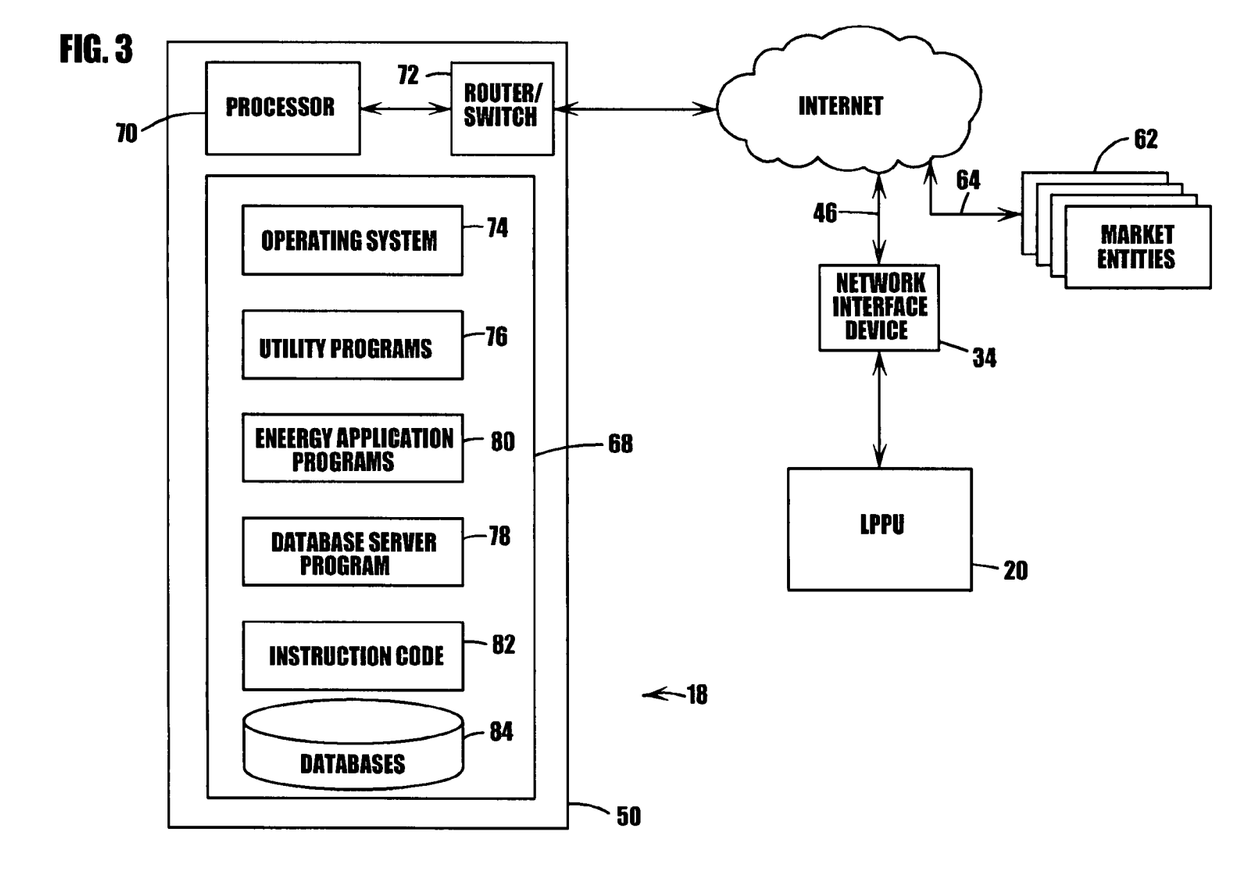
FIG. 3 is a schematic illustration of a server that may be used at the Network Operating Center in one embodiment of the present invention.

Referring now to FIG. 3, there is a diagrammatic representation of one embodiment of a server 50 that may be used in a network operating center 18. The server 50 includes memory 68 for storing data, information and executable code and routines for both internal and external use. Resources include any software, data, files, documents, web pages and other data necessary to practice the subject invention. At least one processor 70 is in communication with memory 68. Router/Switch 72 is also in communication with processor(s) 70 in order to facilitate interaction with the LPPU 20 and control system shown in FIG. 2 via the network interface device 34 and data path 46, and interactions with market entities 62 via data path 64, as is well known to those skilled in the art. In a preferred embodiment, the architecture of server 50 consists of a MIPS or PENTIUM® processor (available from Intel Corporation, 2200 Mission College Boulevard, Santa Clara, Calif. 95052), RAM, and hard disk non-volatile memory large enough to support web files, an operating system, several applications and several databases. The invention is not limited in this regard, and any appropriate architecture known to those skilled in the art may be used.

With continued reference to FIG. 3, operating system 74 and utility programs 76 reside on or are accessible by the processor 70. The operating system 74 and utility programs 76 are used by the system developers to develop and implement the subject invention. In the preferred embodiment, WINDOWS NT® software (available from Microsoft Corporation, One Microsoft Way, Redmond, Wash. 98052-6399) or the Compaq Himalaya NONSTOP software is the server operating system. In the preferred embodiment, server 50 houses a MICROSOFT SQL SERVERS software (available from Microsoft Corporation, One Microsoft Way, Redmond, Wash. 98052-6399) or Compaq Computer Corporation's NONSTOP SQL server software which serves as an database server program 78. Server 50 also stores or can access energy application programs 80 and the instruction execution code 82 which is the instruction set necessary to implement the subject invention. It is noted that while the exemplary description herein refers to specific software, those skilled in the art will readily appreciate that substitutions may be made thereto without departing from the spirit and scope of the present invention.

In a preferred embodiment, memory 68 stores, or has access to, a multiplicity of databases as denoted generally by reference numeral 84. It is envisioned that the databases are created utilizing MICROSOFT SQL or COMPAQ NONSTOP SQL SERVER@, as is well known in the art. Database 84 contains data derived or sent from the LPPU 20 via the network interface device 34, including operating parameters, total power output, local consumption, and any other parameters that may be measured, monitored and stored and used in implementing the present invention. In other embodiments, additional servers can be provided for storing databases or for performing additional functions in order to provide enhanced performance and stability. Computer monitors and keyboards (not shown), and my other equipment known to those skilled in the art, can be located at the network operating center to allow users to access information and provide instructions for the operation of the distributed energy network through the servers.

Figure 4:
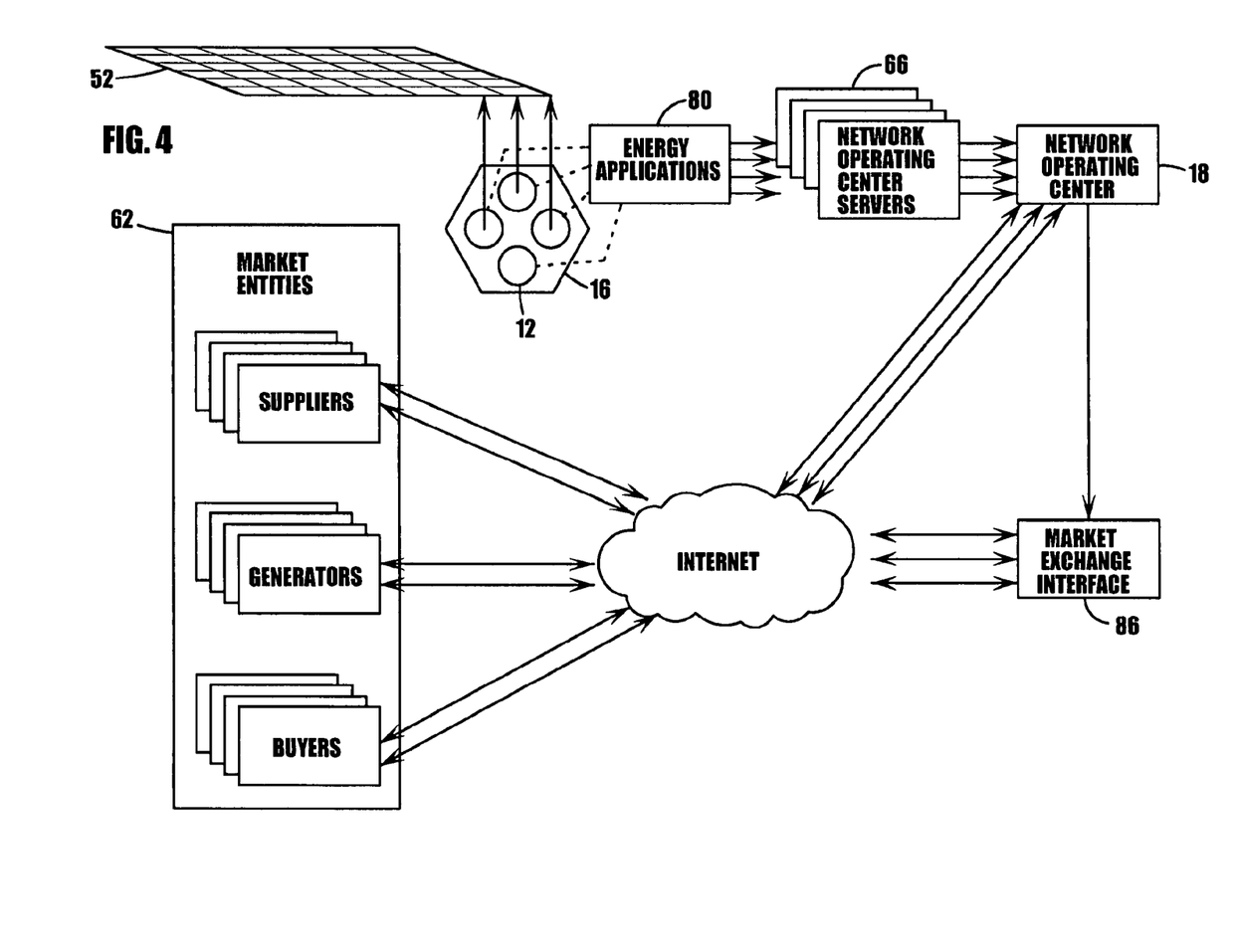
FIG. 4 is a block diagram illustrating the communication paths for a sale of excess power from the distributed energy network.

Referring to FIG. 4, the network operating center 18 communicates with market entities 62 through a market exchange interface 86. An independent system operator or other transmission system operator may provide the market exchange mechanism. Communication means, such as the communication means described above for communication between the network interface device and the network operating center, allow communication between the network center 18 and the market entities 62 to negotiate, close and settle power purchase transactions. The market entities 62 include both suppliers, generators and buyers of energy.

Through the use of the network topology and the energy applications 80, the preferred embodiment allows for the creation of an aggregation of distributed power producing nodes 12 into a fully integrated network of power production with many points of interconnection with the incumbent power grid, or with a private power transmission or bus system or grid 52, which may itself be interconnected with the incumbent power grid (all of the network operating centers, LPPUs, MUs, transceivers, network interface devices, communication/data paths, servers and applications, grid switch devices, other data devices, and associated processes being referred to herein as the "Power Plant"). The energy applications 80 provide means for determining the available aggregate quantity of excess power generation capacity for the plurality of LPPUs based upon respective LPPU operating performance data and the power consumption data. The network operating center server 50 provides a means for communicating an offer to sell at least part of the aggregate quantity of excess power generation capacity of the plurality of local power production units to market entities 62, and a means for receiving from at least one market entity an order to purchase a quantity of excess power generated by the LPPUs. Each respective network operating center server 50 works with the individual network interface devices to provide the means for communicating with the plurality of LPPUs to provide each individual LPPU with instructions regarding the quantity of power to be produced and a means for receiving and storing data relating to the quantity of power transmitted to each power purchasing entity.

Utilizing the energy applications 80, the distributed power producing elements of the Power Plant can be placed into a virtual cellular configuration or topology whereby one or more LPPUs or nodes are grouped together by one or more of a plurality of relevant environmental parameters or factors, such as geography, mutual proximity, combined generation outputs, peaking, non-peaking environments and market load requirements, and incumbent transmission and delivery system architectures, to enable the collective and coordinated generation of power from one or more groups of LPPUs which can be specifically placed into service for, at the request of, or as otherwise agreed with market entities 62 within a localized or specified market and, in so doing, maximize economic returns by such means as, but not limited to, minimizing line losses through matching localized demand with generation, limiting transmission distances, and sequencing power generation to enable other market entities, including generators, to exporting power quantities out of the local region which are off-set by cumulative power deliveries made to the market entities by device(s) described herein. The cellular structure is dynamic and defined virtually through a software based structural assignment application which defines one or more LPPUs or nodes in sets, and can be dynamically changed through reassignment using any one or more of the environmental parameters discussed above.

The energy applications 80 that are run at one or more network centers 18 monitor a variety of operational and usage outputs, and provide the means for determining the quantity and quality of excess power that may be generated by any particular LPPU for sale to market entities 62. Some of the functions performed by the energy applications 80 include: (1) monitoring energy output levels from the LPPUs for collective administration purposes; (2) monitoring local energy load consumption and determining energy consumption and usage profiles from the end-user premises that are multi-parameter based for purposes of collective power management administration, and may include consideration of such factors as:

(i) Time of day,
    Time of Week, or any other period
    Seasonality
    Ambient temperatures
    Degree Days
    Patterns of energy consumption (locally at a node or extensibly throughout any sub-portion or portion of the network); determining the power generating capacities that can be obtained from LPPUs on an individual and aggregate basis for any period or periods of time; and determining theoretical power production capacities, excess power production capacities of the combined LPPUs as a function of various time periods, and establishing algorithms to establish statistically reliable excess power generation capabilities for the purpose of entering into compacts and agreements as an energy generating entity with Market Entities to provide power to the grid upon the request, demand or pursuant to prior agreement or arrangement with any such Market Entities;

(ii) Using the methods above, establishing virtual power reserves and pools of standby power by dynamically controlling, on a real time or polling basis, the production output of one or more LPPUs, and generating or calling up reserved power by instructing one or more LPPUs to increase output production to eliminate any power shortfalls or anomalies under any power delivery commitment to Market Entities;

(iii) Using the above methods, establishing a means or mechanism to provide end-users with primacy or priority for LPPU power production for local load consumption, while, through the use of the virtual reserves as well as the real time monitoring of load consumption variations among constituent LPPUs and their associated available surplus power capabilities, to provide consistent and level power exports to the grid over a defined period of time.

In those cases where no compact, tariff, arrangement or agreement exists between, or pertaining to, the entity owning or operating one or more Power Plants and market entities, net metering laws, for the sale and purchase of excess power, may be used by employing the energy applications 80, using applicable algorithms for determining for each LPPU 12, or any node, when excess power is permitted to be generated and furnished back into the grid 52, and, further, to compute when no economic value is returned to any individual LPPU 12, node 20, or group of nodes 16.

The energy applications 80 may also include automatic trouble shooting, diagnostic and automatic repair call applications whereby when any one or more LPPUs fail or fail to run within normal or expected manufacturer or other established or specified operating parameters, the performance related data sent from the associated data devices is analyzed and compared against standard or normal operating parameters, and if the performance data is processed and yields substandard operating conditions or component failure, a remote diagnostic test is run and, if the LPPU is not capable of being remotely repaired, an electronic trouble ticket is automatically generated and sent to an available system technician for dispatching said technician to the specific node, link, or point requiring remediation, repair or replacement. The energy applications employ automatic procedures using the apparatus described herein to control the electrical energy output of individual LPPUs, to switch individual units remotely and systematically to required levels of production, and to marshal the LPPUs collectively into an identifiable merchandisable energy unit.

The energy applications may also cause the network operating center 18 to monitor, collect and store data on the amount of various emissions that are generated from the LPPUs while operating and producing power, and determining environmental efficiency states and quality of fuel reformation, fuel impurities and compliance with manufacturer recommended standards.

Exemplary source code for implementing the method is provided in the Software Appendix provided on compact disc herewith as identified above. The exemplary source code provided herewith is not intended to limit the present invention in any way, and it will be readily understood by those skilled in the art that the code and programs used to implement the methods described herein can be written in numerous ways.

Figure 5:
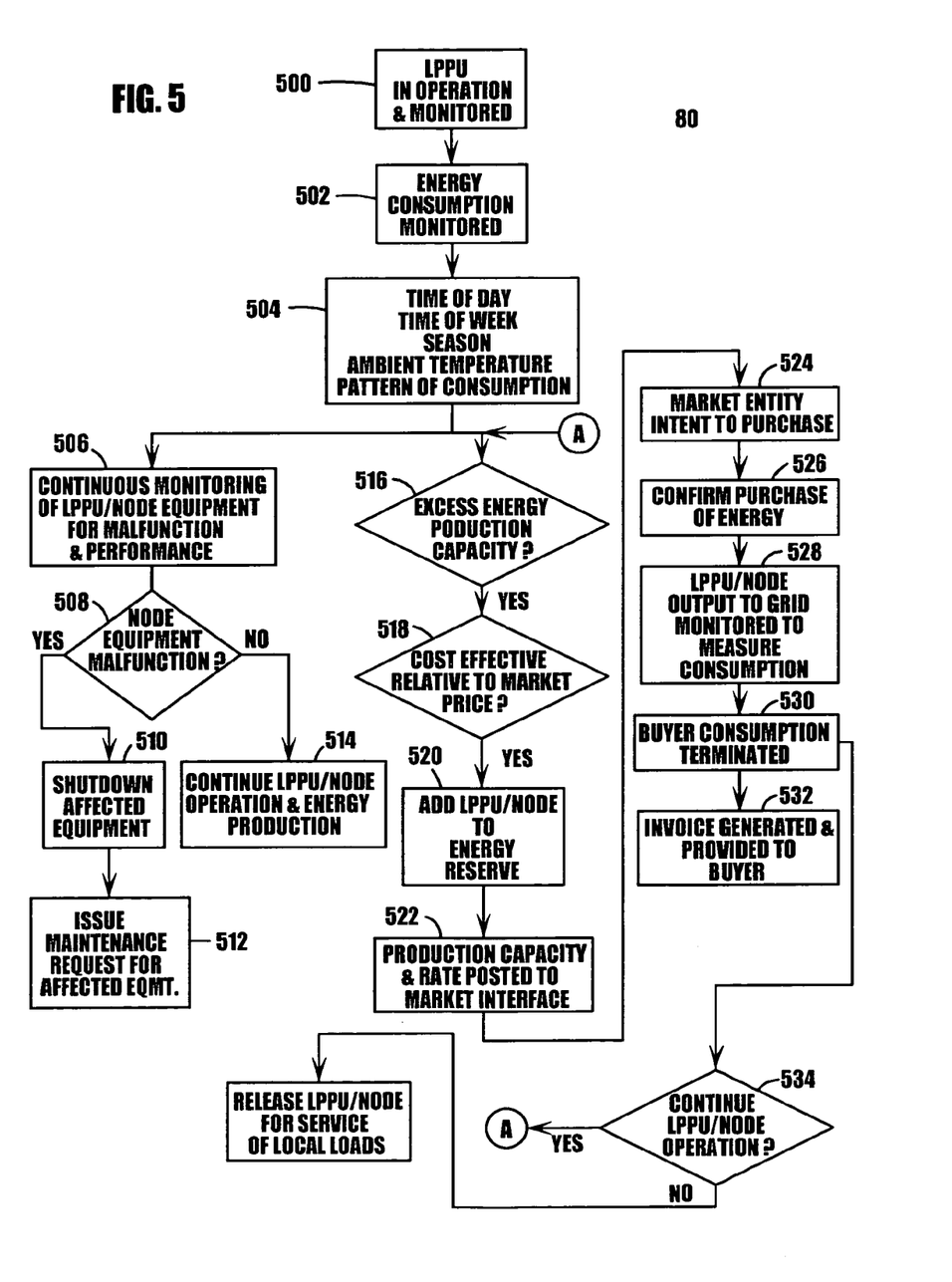
FIG. 5 is a flowchart illustrating a process for managing an enhanced distribution network in accordance with an embodiment of the present invention.

Referring now to FIG. 5, there is illustrated a flowchart depicting a process for operating a single LPPU in accordance with an embodiment of the present invention. At step 500, the LPPU is in operation, and the operating parameters for the LPPU are being monitored, with data transmitted as described above to the network operating center 18. At step 502 the local energy consumption for the LPPU 20 is monitored, while at step 504 operating parameters such as the time of day, day of the week, season, and ambient temperature are monitored.

In one aspect of the process, monitoring of the LPPU is undertaken to determine that the LPPU is operating properly. At step 506, the LPPU is monitored by transmitting data regarding selected LPPU operating parameters to the MU and/or the network operating center. At step 508, the operating data from the LPPU 20 is compared to predetermined values or ranges for each selected operating parameter in the MU or at the network operating center using the Energy Applications to determine if the LPPU is malfunctioning. If the LPPU is operating outside of the predetermined value or range for an operating parameter, the process proceeds to step 510 and the affected LPPU is shut down. At step 512, the system generates a maintenance request for the affected equipment and a technician is dispatched to repair the equipment as necessary.

Referring again to step 506, if the LPPU is operating within the predetermined value or range for the selected LPPU operating parameters, the process proceeds to step 514, continued operation and monitoring of the LPPU.

In a second aspect of the process, the data monitoring system and Energy Applications are used determine whether there is excess energy generating capacity that can be economically sold to Market Entities. At step 516, the Energy Applications compare LPPU generating capacity to local demand to determine if there is excess generating capacity. If there is excess generating capacity, the process proceeds to step 518, and the Energy Applications determine whether the cost of generating power from the LPPU is economical relative to the market price offered by Market Entities. Selected generating expenses, such as fuel costs, can be determined and transmitted through the network operating center on a real time basis, and the Energy Applications will determine the unit cost for producing electricity from the LPPU. The Energy Applications compare the generating cost to the market price offered by Market Entities, and if the market price exceeds the generating cost, the available energy generating capacity available in the distributed energy network is added to the energy reserve at step 520. If the market price is less than the generating cost, then the unit is not added to the energy reserve.

At step 522 the available energy production capacity from the LPPU is posted, together with the available energy production capacity from the other LPPUs to market interface to allow Market Entities to bid for the available power. At step 524, the Market Entities communicate an offer to buy through the market interface. The Energy Applications compare all bids received from Market Entities, and at step 526, a purchase of energy by the highest bidding Market Entity is confirmed through the market interface. At step 528, the LPPUs receive a signal from the network operating center to produce a specified quantity of energy, and the LPPU is interconnected to the grid. The energy transmitted from the LPPU to the grid is metered to monitor the quantity of energy supplied from the LPPU.

At step 530, after the quantity of energy purchased by the Market Entity has been delivered, consumption of energy supplied by the LPPU to the purchasing Market Entity is terminated. At step 532, an invoice is generated and transmitted to the purchasing Market Entity.

As shown at step 534, when the purchasing Market Entity has received the quantity of energy purchased, the Energy Applications will return to step 516 to determine whether there is excess generating capacity from the LPPU that can be sold cost effectively to a Market Entity. If there is no longer excess generating capacity available from the LPPU, or if available excess generating capacity from the LPPU cannot be cost effectively sold to a Market Entity, the process proceeds to step 536, and the LPPU is dedicated entirely to local loads.

It should be understood that the flow chart of FIG. 5 depicts the method in relation to a single LPPU. For an array comprising a plurality of LPPUs, each individual LPPU would typically provide required energy for its local load as its first priority. Thus, at a specific point in time, an individual LPPU may be serving only local loads, while the plurality of LPPUs considered as a group provides the required energy generation. Accordingly, if local demand increases for a first LPPU in the network while power is being sold to a Market Entity, the network operating center will call upon one or more other LPPUs in the network to increase energy production to replace the energy from the first LPPU that is diverted to serve its local load. The Energy Applications apply statistical operational models to ensure that, for the network of LPPUs, there is sufficient reserve capacity to meet all commitments to Market Entities.

By interconnecting a plurality of LPPUs as described above, a virtual power generation plant or entity may be established that is principally defined through network interconnection and legal relationships that permits each LPPU to be a power generating component of the Power Plant. For example, the LPPUs may be owned by a public service or utility company or other licensed generator or distributor, cooperative, corporation, limited partnership, partnership, limited liability company or other legal entity or person (the "Organization") and placed at the end-user premises with the end-user's consent. The LPPU may be leased by the end-user for localized consumption, with all excess power owned by the cooperative and all costs of excess power consumption borne by the cooperative. The end-user may be either a member or beneficial owner in or of the cooperative or business or not a member or owner.

Alternatively, the LPPU may be owned by the end-user and the Organization may lease the LPPU for purposes of generating excess capacity from the LPPU, or for the purpose of supplying the end-user's local load demands and also generating excess capacity. Any combination of the above or similar combination wherein the Organization does not purchase excess power from the end-user, thus being an aggregator.

The network of LPPUs described herein may provide other advantages for LPPU owners. For example, through the use of the Organization lower fuel costs for the LPPUs may be obtained by means of wholesale or volume purchasing of fuels, such as propane, natural gas and other hydrocarbon based products, by virtue of the fact that the LPPUs and/or their associated end-users are aggregate by means of the Invention, or parts thereof.

In another embodiment of the invention, the Organization may be an "aggregator" as that term is typically used in the industry by establishing a system that is principally defined through network interconnection and legal relationships that permits each LPPU 20 to sell excess or surplus power to the aggregation entity that employs the preferred embodiment and to allow the aggregator to sell the collective power derived from the LPPUs, or subsets thereof, to Market Entities.

In yet another embodiment of the present invention, the network may be used to allow the Organization or LPPU owners to obtain or maximize other economic benefits attendant to power generation. For example, through the Energy Applications and the Power Plant, means may be established to track environmental, gas and particulate emissions from LPPUs, and either individually or collectively, or in subsets thereof, collecting such emissions data, and using such data in relation to power production, LPPU plant sizes, locations or fuel consumption, and/or any other data, information or parameters that are derived from LPPUs, MUs, Data Devices or their premises or environments, to permit the sale, exchange, trading, or use of pollution or air emission credits, vouchers or any other form economically realizable benefit that is or hereafter may become available or is conferred through or by any foreign, or domestic, federal, state, provincial, municipal, county or other form of political subdivision or governmental, quasi-governmental or judicially or treaty recognized entity ("Air Credits"). The Energy Application may be used, either on behalf of the LPPU constituents, or the owner or operator of the Power Plant, or in any combination thereof, to sell, exchange, trade, transfer or assign, directly or indirectly, either on a transactional basis (for example, but not limited to, contract, auction process, market biding and offer process, or compact), or by means of combination or aggregation (either at a systems integration, system definition, joint applicant, joint venture or business entity, cooperative, association or other similar level), Air Credits to Market Entities or any other parties or persons.

The systems and methods described herein may also be used to establish a private grid configuration. Through the use of the Power Plant and Energy Applications, the creation of private local, distributed power grids may be created whereby one or more LPPUs are interconnected with or through a power transmission, bus or delivery system which permits the transmission and/or delivery of generated power from one or more power sources to two or more end-users being connected to the private grid and having a cognizable or defined community of interest (such as, but not limited to, condominiums, planned unit developments, cooperatives, or associations, premises owned in common or through affiliation). The system allows power generated from the LPPUs, or certain available portions thereof, to be delivered as primary or supplemental power to one or more other end-users whose loads are connected with and served, either as a primary power source or supplemental or back-up power source, to the private grid. By way of example, if there shall exist an 8 house subdivision, where all 8 houses are connected with a power bus system that enables power to be transmitted by and between the houses, and such system is not part of the incumbent utility grid but rather owned, operated, licensed, leased or otherwise used by the subdivision, power may be generated through one or more LPPUs and delivered to one or more end-users over the private grid.

The Private Grid configuration discussed above may further include one or more direct or indirect interconnections to the public utility grid system. In this configuration, the Power Plant and Energy Applications are used, after or in concert with administering local power generation and distribution requirements and needs, to allow any surplus capacity to be sold or traded as described above, in this case either on behalf of private association, its affiliate, and/or one or more of the constituents within the private association.

Using the system and methods in any one or more of the configuration states described above, wherein there is at least one point of interconnection with the public power grid, or where one or more LLPUs are located at end-user premises but either owned, leased or operated by the incumbent transmission delivery provider or incumbent generator serving the end-user, the Power Plant topology and methods aforementioned can be used as a novel and alternative means of supplementing, alleviating, limiting or enhancing conventional centralized power generation and transmission delivery systems, and multi-jurisdiction or cross-service area, power sharing, transport or delivery systems. Chiefly, the claimed system and method can be used to eliminate, reduce, temper the need or desire for, or supplement the magnitude of the need or desire for, high capacity power transmission delivery systems that are designed to transport power from any area to another. This is accomplished by permitting power to be generated at the periphery of the transmission and delivery system through the LPPUs and being able to account for power generation in amount, time and place, both by geographical coordinates and grid system geography coordinates, and thusly reducing or eliminating power import requirements that must be satisfied through the transport of power from other areas using high capacity transport lines. The application can both delay the implementation or need for adding, direct or indirect, additional high capacity transmission infrastructure, or substitute or replace existing transport infrastructure.

The system of the preferred embodiment creates a distinct generating entity through a network topology, whereby energy producing nodes are intelligently interconnected for purposes which include creating enterprise level energy management, monitoring and operation systems of which the localized energy producing units are sub-components of the overall distinct legal or physical entity. This is distinctly different and novel from prior systems and methods which are alleged to be novel and which rely upon the use of circuits and undefined programmable controller units located at local energy sites for the purpose of providing or collecting and using individual energy site data for use by an "aggregator" for purposes of maximizing economic benefit under "net metering laws." For example, as described in U.S. Pat. No. 6,255,805 to Papalia et. al, prior systems may be used to allow a single generator to be configured to deliver electrical energy to the power grid. The embodiments described herein are directed to systems and methods of creating a virtual power generating plant or entity comprising several LPPUs that are capable of producing variable power in quantities and places through the general electric supply market infrastructure. The systems and methods described herein resolve the commonly understood problems with restrictions under "net metering"

laws regarding the timing and point of delivery of electricity from local generators. Whereas existing systems permit a maximization under net metering law concepts (many of which only permit zero metering), the systems and methods described herein permit additional quantities of power to be generated and marketed beyond the restrictions present under prior systems and methods for use with single generators.

The system and methods described herein, rather than using localized site controllers, utilizes a distributed application architecture whereby data is exchanged from localized sites, and applications are effected through Java applets, or any other efficient system of code sent from a remote processor to a local processor. The resulting system and method allows interconnection of local power units, known as Nodes, are interconnected through communication paths.

The system and methods described herein are preferably implemented using software applications which manage two or more power producing nodes from an overall distinct enterprise level, and provide a means through which the power network entity, either for itself or on behalf of LPPU owners or users, can effectively enter into agreements and compacts with other Market Entities within a given energy market. This is in contrast to other systems that process information and data, and are designed to maximize economic returns on individual power producing units under "net metering" or similar laws. Net metering laws allow end-users to interconnect local power units to the power grid and place excess energy into the grid and in most cases limit the energy exchange transaction to a net zero for a defined period.

The systems and methods of embodiments described herein apply the concepts of networking to the newly arising field of local alternative energy source units such as fuel cells, and micro-turbines, solar or wind devices, and other localized methods of producing energy. Additional novelty exists in that cellular based (or set theory based) structures are imposed upon N+1 nodes, utilizing one or more of a plurality of parameters, which enable distinct market demand based power generation inputs, such as by means of locality, line loss considerations, and other considerations, to be created, operated, managed, and controlled relative to then prevailing power market conditions and the behaviors, demands and needs of other Market Entities. The systems and methods of the present invention apply traditionally understood business entity and legal concepts to a collective group of end-users and their associated "plant" in such a way that, in combination with the overall network topology, a unique and distinctive power producing entity is created that may produce energy, negotiate contracts and make transactions for it's behalf and for the benefit of it's component nodes, or end-users.

Other features and advantages of the present invention will become apparent from the accompanying drawings, which illustrate, by way of example, the principles of the invention. The preferred embodiments of the invention described herein are exemplary and numerous modifications, dimensional variations, and rearrangements can be readily envisioned to achieve an equivalent result.

What is claimed is:

1. A system for managing an energy distribution network of local power production units over a distributed communications network, comprising:
    a control server configured to control the power production of a plurality of local power production units, wherein the control server determines the amount of power to be provided by each of the local power production units based on at least the operating characteristics of the local power production units, local power production needed by the local power production units, and sequencing power generation among the energy distribution network and interconnected local power production units, wherein the control server is configured to establish a plurality of operational nodes comprising one or more local power production units, wherein a grouping of local power production units into a particular operational node is based upon geography, mutual proximity, combined generation power outputs, or peaking/non-peaking performance considerations of the local power production units, wherein the control server is configured to dynamically add or remove local power production units from the operational node;
    a plurality of local power production interface units configured to:
        receive control messages from the control server, wherein each of the local power production interface units is communicatively coupled to a local power production unit; and
        transmit operating characteristic messages to the control server, wherein each of the local power production interface units includes one or more data interfaces configured to receive operating characteristic information from a one or more of the local power production unit, an electrical meter, a thermometer, a gas pressure meter, a fuel pressure meter or a fuel consumption meter; and
    an interconnection switch coupled to each local power production unit and a power grid, wherein the control server is configured to operate the switch.

2. The system of claim 1, wherein the control server is further configured to determine the efficiency of fuel consumption for each local power production unit based on emissions data received by the control server from the local power production interface units.

3. The system of claim 1, wherein the local power production units comprise one or more of fuel cells, microturbines, solar electrical generating devices and wind based electrical generating devices.

4. The system of claim 1, wherein the control server is further configured to dynamically adjust the amount of power produced by one or more of the local power production units in response to a change in energy production by one or more local power production units, wherein the total power produced by the one or more local power production units is maintained to achieve a target power amount.

5. The system of claim 1, wherein the control server is further configured to determine the amount of power to be provided by each of the local power production units by considering a factor based on minimizing transmission line losses between the local power production units and the power purchasing entity.

6. A system for managing an energy distribution network of local power production units over a distributed communications network, comprising
    a control server configured to control the power production of a plurality of local power production units, wherein the control server determines the amount of power to be provided by each of the local power production units; and
    a plurality of local power production interface units coupled to the control server configured to provide instructions to local power production units,
    wherein the control server is further configured to establish a plurality of operational nodes comprising one or more local power production units, wherein a grouping of local power production units into a particular operational node is based upon one or more of geography, mutual proximity, combined generation power outputs, or peaking/non-peaking performance considerations of the local power production units, wherein the control server is configured to dynamically add or remove local power production units from the operational node.

7. The system of claim 6, wherein the control server determines the amount of power to be provided by each of the local power production units based upon minimizing transmission line losses between the local power production units and the power purchasing entity.

8. The system of claim 6, wherein the local power production units comprise one or more of fuel cells, microturbines, solar electrical generating devices and wind based electrical generating devices.

9. The system of claim 6, wherein the control server is further configured to determine the efficiency of fuel consumption for each local power production unit based on emissions data received by the control server from the local power production interface units.

10. The system of claim 6, wherein the control server is further configured to dynamically adjust the amount of power produced by one or more of the local power production units in response to a change in energy production by one or more local power production units, wherein the total power produced by the one or more local power production units is maintained to achieve a target power amount.

11. The system of claim 6, further comprising an interconnection switch coupled to each local power production unit and a power grid, wherein the control server is configured to operate the switch.

* * * * *